United States Patent
Langselius et al.

(10) Patent No.: US 9,878,190 B2
(45) Date of Patent: Jan. 30, 2018

(54) FLAME RETARDANT AND FIRE EXTINGUISHING PRODUCT FOR FIRES IN SOLID MATERIALS

(71) Applicant: Miraculum, Inc., Austin, TX (US)

(72) Inventors: Britt Ann-Christine Langselius, Austin, TX (US); Freddy Kai Klaffmo, Arbrå (SE)

(73) Assignee: MIRACULUM, INC., Winter Park, FL (US)

( * ) Notice: Subject to any disclaimer, the term of this patent is extended or adjusted under 35 U.S.C. 154(b) by 0 days.

(21) Appl. No.: 15/425,701

(22) Filed: Feb. 6, 2017

(65) Prior Publication Data

US 2017/0274235 A1 Sep. 28, 2017

Related U.S. Application Data

(60) Continuation of application No. 14/806,602, filed on Jul. 22, 2015, now Pat. No. 9,586,070, which is a continuation-in-part of application No. 14/692,724, filed on Apr. 21, 2015, now abandoned, which is a continuation-in-part of application No. 14/481,939, filed on Sep. 10, 2014, now abandoned, which is a division of application No. 14/295,307, filed on Jun. 3, 2014, now abandoned, which is a continuation of application No. 14/161,679, filed on Jan. 22, 2014, now abandoned.

(60) Provisional application No. 61/755,036, filed on Jan. 22, 2013.

(51) Int. Cl.

| A62D 1/00 | (2006.01) |
| C09K 21/04 | (2006.01) |
| C09K 21/10 | (2006.01) |
| C09K 21/12 | (2006.01) |
| C08L 27/12 | (2006.01) |
| C09D 5/18 | (2006.01) |

(52) U.S. Cl.
CPC ........... *A62D 1/0042* (2013.01); *A62D 1/005* (2013.01); *A62D 1/0035* (2013.01); *A62D 1/0064* (2013.01); *C08L 27/12* (2013.01); *C09D 5/18* (2013.01); *C09K 21/12* (2013.01)

(58) Field of Classification Search
None
See application file for complete search history.

(56) References Cited

U.S. PATENT DOCUMENTS

| 848,627 | A | | 4/1907 | McLaughlin, et al. | |
| 2,262,634 | A | * | 11/1941 | Cobbs | D06M 13/292 |
| | | | | | 106/18.13 |
| 3,245,904 | A | * | 4/1966 | Young | A62D 1/0064 |
| | | | | | 252/2 |
| 3,562,197 | A | * | 2/1971 | Sears et al. | C01B 25/405 |
| | | | | | 106/18.15 |
| 4,115,351 | A | * | 9/1978 | Joh | C08K 9/04 |
| | | | | | 264/182 |
| 4,346,012 | A | * | 8/1982 | Umaba | A62D 1/0014 |
| | | | | | 169/47 |
| 4,610,311 | A | | 9/1986 | Bronner et al. | |
| 4,839,065 | A | * | 6/1989 | Vandersall | A62D 1/0064 |
| | | | | | 106/14.05 |
| 4,871,477 | A | | 10/1989 | Dimanshteyn | |
| 4,871,795 | A | * | 10/1989 | Pawar | C08K 3/32 |
| | | | | | 252/609 |
| 4,871,895 | A | | 10/1989 | Preston | |
| 4,971,728 | A | | 11/1990 | Vandersall | |
| 4,983,326 | A | | 1/1991 | Vandersall | |
| 5,091,097 | A | | 2/1992 | Pennartz | |
| 5,340,871 | A | | 8/1994 | Pearson et al. | |
| 5,393,437 | A | | 2/1995 | Bower | |

(Continued)

FOREIGN PATENT DOCUMENTS

| EP | 0212017 A1 | 3/1987 |
| EP | 0848627 A1 | 6/1998 |
| EP | 1546286 A1 | 6/2005 |
| EP | 2334596 A2 | 6/2011 |
| JP | H 1081804 A | 3/1998 |
| RU | 2320387 C2 | 3/2008 |
| WO | WO-2011/016773 A1 | 2/2011 |
| WO | WO-2012-071577 A2 | 5/2012 |
| WO | WO-2013/145207 A1 | 10/2013 |

OTHER PUBLICATIONS

FCW-44. Materials Safety Data Sheet [online]. Passive Fire Protection Partners, 2012 [retrieved on Aug. 17, 2014]. Retrieved from the Internet: <URL: http://www.firestop.com/productsheets/msdscableway.pdf>.

(Continued)

*Primary Examiner* — Joseph D Anthony
(74) *Attorney, Agent, or Firm* — Foley Hoag LLP; Lucas Watkins

(57) ABSTRACT

A novel flame retardant and fire extinguishing product for preventing and fighting fires in solid materials is disclosed herein. The product is thixotropic and non-toxic, and comprises water, one or more flame retardants, one or more stabilizers, and one or more preservatives. In some embodiments, the product further comprises one or more thickeners, one or more binders, one or more fining agents, one or more firming agents, one or more water retention agents, one or more water-soluble fluoropolymers or other water-soluble polymers with similar properties, one or more detergents, and/or one or more surfactants. The product may be used as a flame retardant to prevent fires and in active firefighting. The product may be biodegradable in a natural environment, may be readily cleaned off equipment and materials using water, and may also provide other features which render it safe for the environment as compared to other commonly used products in fire prevention and firefighting.

17 Claims, No Drawings

(56) References Cited

U.S. PATENT DOCUMENTS

| | | | |
|---|---|---|---|
| 5,425,426 | A | 6/1995 | Baratov et al. |
| 5,518,638 | A | 5/1996 | Buil et al. |
| 5,833,874 | A | 11/1998 | Stewart et al. |
| 5,948,232 | A | 9/1999 | Murphy et al. |
| 6,015,838 | A | 1/2000 | Stern et al. |
| 6,238,594 | B1 | 5/2001 | Turpin et al. |
| 6,322,726 | B1 * | 11/2001 | Vandersall ............ A62D 1/0035 252/2 |
| 6,379,578 | B1 | 4/2002 | Shiga |
| 6,447,697 | B1 | 9/2002 | Vandersall |
| 6,612,243 | B1 | 9/2003 | Italiane et al. |
| 6,652,633 | B2 | 11/2003 | Pasek et al. |
| 6,740,250 | B2 | 5/2004 | Greiner et al. |
| 6,802,994 | B1 | 10/2004 | Kegeler et al. |
| 6,905,639 | B2 | 6/2005 | Vandersall et al. |
| 7,135,125 | B2 | 11/2006 | Clark |
| 7,381,696 | B2 | 6/2008 | Hubert et al. |
| 7,713,365 | B2 | 5/2010 | Silvers et al. |
| 8,080,169 | B2 | 12/2011 | Kariya |
| 8,080,186 | B1 | 12/2011 | Pennartz |
| 8,778,213 | B2 | 7/2014 | Guo et al. |
| 9,265,978 | B2 * | 2/2016 | Klaffmo ............... A62D 1/0035 |
| 2002/0013403 | A1 * | 1/2002 | Vandersall .............. A62D 1/005 524/547 |
| 2002/0013404 | A1 * | 1/2002 | Buter .................. C08G 18/0828 524/604 |
| 2002/0100897 | A1 * | 8/2002 | Vandersall ............ A62D 1/0035 252/601 |
| 2003/0141081 | A1 * | 7/2003 | Clark ................... A62D 1/0085 169/48 |
| 2003/0212177 | A1 | 11/2003 | Vandersall et al. |
| 2005/0001197 | A1 | 1/2005 | Clark |
| 2006/0192186 | A1 * | 8/2006 | Matsumura ........... C08K 5/0066 252/601 |
| 2009/0096668 | A1 * | 4/2009 | Chen ....................... G01S 19/29 342/357.68 |
| 2010/0069488 | A1 | 3/2010 | Mabey et al. |
| 2010/0227070 | A1 | 9/2010 | Grunlan |
| 2010/0298474 | A1 * | 11/2010 | Futterer ................... C08K 3/32 524/100 |
| 2012/0292551 | A1 | 11/2012 | Klaffmo |
| 2012/0295031 | A1 | 11/2012 | Grunlan |
| 2013/0180738 | A1 * | 7/2013 | Kim ..................... A62D 1/0064 169/45 |
| 2014/0202716 | A1 * | 7/2014 | Klaffmo ............... A62D 1/0035 169/45 |
| 2014/0202717 | A1 | 7/2014 | Klaffmo et al. |
| 2014/0284067 | A1 * | 9/2014 | Klaffmo ............... A62D 1/0035 169/45 |
| 2014/0284512 | A1 | 9/2014 | Klaffmo et al. |
| 2015/0224352 | A1 * | 8/2015 | Klaffmo ............... A62D 1/0042 252/2 |

OTHER PUBLICATIONS

FCW-44. Product Data Sheet [online]. Passive Fire Protection Partners, 2010 [retrieved on Aug. 17, 2014]. Retrieved from the Internet: <URL: http://www.firestop.com/productsheets/pdscableway.pdf>.

Firestop 3300PS Intumescent Putty Stick. Materials Safety Data Sheet [online]. Passive Fire Protection Partners, 2012 [retrieved on Aug. 17, 2014]. Retrieved from the Internet: <URL: http://www.firestop.com/productsheets/MSDS3300PS.pdf>.

Firestop 3300PS Intumescent Putty Stick. Product Data Sheet [online]. Passive Fire Protection Partners, 2009 [retrieved on Aug. 17, 2014]. Retrieved from the Internet: <URL: http://www.firestop.com/productsheets/PDS3300PS.pdf>.

Firestop 3500SI Intumescent Spray. Materials Safety Data Sheet [online]. Passive Fire Protection Partners, 2012 [retrieved on Aug. 17, 2014]. Retrieved from the Internet: <URL: http://www.firestop.com/productsheets/MSDS3500SI.pdf>.

Firestop 3500SI Intumescent Spray. Product Data Sheet [online]. Passive Fire Protection Partners, 2010 [retrieved on Aug. 17, 2014]. Retrieved from the Internet: <URL: http://www.firestop.com/productsheets/PDS3500SI.pdf>.

Firestop 3600EX. Materials Safety Data Sheet [online]. Passive Fire Protection Partners, 2012 [retrieved on Aug. 17, 2014]. Retrieved from the Internet: <URL: http://www.firestop.com/productsheets/msds3600EX.pdf>.

Firestop 3600EX. Product Data Sheet [online]. Passive Fire Protection Partners, 2010 [retrieved on Aug. 17, 2014]. Retrieved from the Internet: <URL: http://www.firestop.com/productsheets/pds3600EX.pdf>.

Firestop 4100NS. Materials Safety Data Sheet [online]. Passive Fire Protection Partners, 2012 [retrieved on Aug. 17, 2014]. Retrieved from the Internet: <URL: http://www.firestop.com/productsheets/MSDS4100NS.pdf>.

Firestop 4100NS. Product Data Sheet [online]. Passive Fire Protection Partners, 2010 [retrieved on Aug. 17, 2014]. Retrieved from the Internet: <URL: http://www.firestop.com/productsheets/PDS4100NS.pdf>.

Firestop 4100SL. Materials Safety Data Sheet [online]. Passive Fire Protection Partners, 2012 [retrieved on Aug. 17, 2014]. Retrieved from the Internet: <URL: http://www.firestop.com/productsheets/MSDS4100SL.pdf>.

Firestop 4100SL. Product Data Sheet [online]. Passive Fire Protection Partners, 2010 [retrieved on Aug. 17, 2014]. Retrieved from the Internet: <URL: http://www.firestop.com/productsheets/PDS4100SL.pdf>.

Firestop 4800DW. Materials Safety Data Sheet [online]. Passive Fire Protection Partners, 2012 [retrieved on Aug. 17, 2014]. Retrieved from the Internet: <URL: http://www.firestop.com/productsheets/MSDS4800DW.pdf>.

Firestop 4800DW. Product Data Sheet [online]. Passive Fire Protection Partners, 2010 [retrieved on Aug. 17, 2014]. Retrieved from the Internet: <URL: http://www.firestop.com/productsheets/PDS4800DW.pdf>.

Firestop 5100SP. Materials Safety Data Sheet [online]. Passive Fire Protection Partners, 2012 [retrieved on Aug. 17, 2014]. Retrieved from the Internet: <URL: http://www.firestop.com/productsheets/MSDS5100SP.pdf>.

Firestop 5100SP. Product Data Sheet [online]. Passive Fire Protection Partners, 2010 [retrieved on Aug. 17, 2014]. Retrieved from the Internet: <URL: http://www.firestop.com/productsheets/PDS5100SP.pdf>.

Firestop EBI-60. Materials Safety Data Sheet [online]. Passive Fire Protection Partners, 2012 [retrieved on Aug. 17, 2014]. Retrieved from the Internet: <URL: http://www.firestop.com/productsheets/msdsEBI-60.pdf>.

Firestop EBI-60. Product Data Sheet [online]. Passive Fire Protection Partners, 2009 [retrieved on Aug. 17, 2014]. Retrieved from the Internet: <URL: http://www.firestop.com/productsheets/pdsEBI-60.pdf>.

Firestop MP1 Intumescent Putty Pad. Materials Safety Data Sheet [online]. Passive Fire Protection Partners, 2012 [retrieved on Aug. 17, 2014]. Retrieved from the Internet: <URL: http://www.firestop.com/productsheets/msdsputtypads.pdf>.

Firestop MP1 Intumescent Putty Pad. Product Data Sheet [online]. Passive Fire Protection Partners, 2009 [retrieved on Aug. 17, 2014]. Retrieved from the Internet: <URL: http://www.firestop.com/productsheets/pdsputtypads.pdf>.

Firestop Pillow. Materials Safety Data Sheet [online]. Passive Fire Protection Partners, 2012 [retrieved on Aug. 17, 2014]. Retrieved from the Internet: <URL: http://www.firestop.com/productsheets/msdspillow.pdf>.

Firestop Pillow. Product Data Sheet [online]. Passive Fire Protection Partners, 2009 [retrieved on Aug. 17, 2014]. Retrieved from the Internet: <URL: http://www.firestop.com/productsheets/pdspillow.pdf>.

Firestop PPC Collar. Materials Safety Data Sheet [online]. Passive Fire Protection Partners, 2012 [retrieved on Aug. 17, 2014]. Retrieved from the Internet: <URL: http://www.firestop.com/productsheets/MSDSCollar.pdf>.

(56) References Cited

OTHER PUBLICATIONS

Firestop PPC Collar. Product Data Sheet [online]. Passive Fire Protection Partners, 2010 [retrieved on Aug. 17, 2014]. Retrieved from the Internet: <URL: http://www.firestop.com/productsheets/PDSCollar.pdf>.
Firestop WS1 Intumescent Strip. Materials Safety Data Sheet [online]. Passive Fire Protection Partners, 2012 [retrieved on Aug. 17, 2014]. Retrieved from the Internet: <URL: http://www.firestop.com/productsheets/MSDSStrip.pdf>.
Firestop WS1 Intumescent Strip. Product Data Sheet [online]. Passive Fire Protection Partners, 2010 [retrieved on Aug. 17, 2014]. Retrieved from the Internet: <URL: http://www.firestop.com/productsheets/PDSStrip.pdf>.
Flameproof Fire Retardant Clear Varnish System. Technical Data Sheet [online]. Rawlins Paints, 2010 [retrieved on Aug. 17, 2014]. Retrieved from the Internet: <URL: http://www.rawlinspaints.co.uk/pdf/FlameProof-Varnish-System_TDS.pdf>.
Flameproof Fire Retardant Varnish Basecoat Activator. Health & Safety Data Sheet [online]. Rawlins Paints, 2007 [retrieved on Aug. 17, 2014]. Retrieved from the Internet: <URL: http://www.rawlinspaints.co.uk/pdf/FlameProof%20Basecoat%20Activator%20MSDS.pdf>.
Flameproof Fire Retardant Varnish Basecoat Base. Health & Safety Data Sheet [online]. Rawlins Paints, 2010 [retrieved on Aug. 17, 2014]. Retrieved from the Internet: <URL: http://www.rawlinspaints.co.uk/pdf/FlameProof%20Basecoart%20Base%20MSDS.pdf>.
Flameproof Fire Retardant Varnish Overcoat. Health & Safety Data Sheet [online]. Rawlins Paints, 2007 [retrieved on Aug. 17, 2014]. Retrieved from the Internet: <URL: http://www.rawlinspaints.co.uk/pdf/FlameProof%20Overcoat%20MSDS.pdf>.
Li, et al., "Intumescent All-Polymer Multilayer Nanocoasting Capable of Extinguishing Flame on Fabric," Advanced Materials, 23(34): 3926-3931 (2011).
Magma Firesheen. Safety Data Sheet. Magma Industries B.V., 2014.
Magma Firestop IMA-120. Safety Data Sheet. AD Productions BV, 2009.
Magma Firestop IMK-433. Safety Data Sheet. Magma Industries B.V., 2012.
Magma Firestop IMW-435. Safety Data Sheet. AD Productions BV, 2009.
Magma Firestop SBP-1. Safety Data Sheet. AD Productions BV, 2009.
Magma Firestop SG-2H. Safety Data Sheet. Magma Industries B.V., 2012.
Magma Firestop TG-3. Safety Data Sheet. Fiber ProTector Norge AS, 2012.
Magma X-Mas Safe. Safety Data Sheet. Magma Industries B.V., 2012.
Timonox Acrylic Eggshell. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxacrilicegghsell.pdf>.
Timonox Acrylic Eggshell. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Acrylic%20Egghsell.pdf>.
Timonox Acrylic Satin. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxacrylicsatin.pdf>.
Timonox Acrylic Undercoat & Acrylic Satin. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Acrylic%20Undercoat%20and%20Acrylic%20Satin.pdf>.
Timonox Acrylic Undercoat. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxacrylicundercoat.pdf>.
Timonox Anti-Graffiti Flame Retardant Glaze. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/TimonoxAntiGraffitiFlameRetardantGlaze.pdf>.
Timonox Anti-Graffiti Flame Retardant Glaze. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Anti%20Graffiti%20Flame%20Ret%20Glaze.pdf>.
Timonox Bonding Primer. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxbondingprimer.pdf>.
Timonox Bonding Primer. Technical Data Sheet [online]. Crown Paints Ltd., 2009 [retrieved on Aug. 17, 2014]. Retreived from the Internet: <URL: http://www.crowntrade.co.uk/Product%20Data%20Sheets/Timonox%20Bonding%20Primer.pdf>.
Timonox Clear Top Coat. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxcleartopcoat.pdf>.
Timonox Clear Top Coat. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Clear%20Top%20Coat.pdf>.
Timonox Intumescent Basecoat. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxintumescentbasecoat.pdf>.
Timonox Intumescent Basecoat. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Intumescent%20Basecoat.pdf>.
Timonox Scrubbable Matt. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxscrubbablematt.pdf>.
Timonox Scrubbable Matt. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Scrubbable%20Matt.pdf>.
Timonox Vinyl Matt. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxvinylmatt.pdf>.
Timonox Vinyl Matt. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Vinyl%20Matt.pdf>.
Timonox Vinyl Silk. Safety Data Sheet [online]. Crown Paints Ltd., 2012 [retrieved on Aug. 17, 2014]. Retreived from the Internet: <URL: http://www.crowntrade.co.uk/Safety%20Data%20Sheets/timonoxvinylsilk.pdf>.
Timonox Vinyl Silk. Technical Data Sheet [online]. Crown Paints Ltd., 2010 [retrieved on Aug. 17, 2014]. Retreived from the Internet: <URL: http://www.crowntrade.co.uk/Product%20Data%20Sheets/Timonox%20Vinyl%20Silk.pdf>.

* cited by examiner

FLAME RETARDANT AND FIRE EXTINGUISHING PRODUCT FOR FIRES IN SOLID MATERIALS

CROSS-REFERENCE TO RELATED APPLICATIONS

This application is a continuation of U.S. Non-Provisional patent application Ser. No. 14/806,602, filed Jul. 22, 2015, now issued as U.S. Pat. No. 9,586,070, which is a continuation-in-part of U.S. Non-Provisional patent application Ser. No. 14/692,724, filed Apr. 21, 2015, which is a continuation-in-part of U.S. Non-Provisional patent application Ser. No. 14/481,939, filed Sep. 10, 2014, which is a divisional of U.S. Non-Provisional patent application Ser. No. 14/295,307, filed Jun. 3, 2014, which is a continuation of U.S. Non-Provisional patent application Ser. No. 14/161,679, filed on Jan. 22, 2014, which claims priority to U.S. Provisional Patent Appl. No. 61/755,036, filed on Jan. 22, 2013, the disclosures of which are incorporated herein in their entireties by reference.

BACKGROUND

Field of the Invention

The present disclosure describes a novel flame retardant and fire extinguishing product for preventing and fighting fires in solid materials.

Description of the Related Art

There are two general methods of reducing the potential damage from the burning of combustible materials—preventive treatment and active firefighting. Preventive treatment with a flame retardant may reduce the flammability of a material. Once a material begins to burn, the fire may be extinguished with an appropriate mix of flame retardants and fire extinguishing agents in liquid, solid, or gaseous form.

The use of flame retardants not only reduces the risk of a fire starting but also hinders its propagation. This increases the available time to escape from the damage and thus protects humans, property, and the environment.

An ideal flame retardant or fire extinguishing agent will have the following properties: (1) it will significantly reduce the flammability of the materials to which it is applied; (2) it will significantly reduce the risk of re-ignition after a material to which it is applied is exposed to fire conditions; (3) it will be non-toxic to humans, animals, and plants; (4) it will be biodegradable or at least not harmful to the environment; (5) it will not cause the release of toxic or corrosive substances under extreme fire conditions; (6) it will not migrate from the materials to which it is applied via evaporation or other forms of release; (7) it will not negatively affect the recyclability of materials to which it is applied; and (8) its production, processing, application, and disposal or recycling will not cause significant environmental harms.

Numerous flame retarding and fire extinguishing agents are available for reducing the risk of fire and active firefighting. However, each of the available agents for retarding and fighting fires has shortcomings.

Currently available flame retardants present several shortcomings: (1) most currently available flame retardants are designed for indoor use only; (2) many currently available flame retardants have a limited effective lifetime and require repetition of the impregnation process at regular intervals to successfully protect materials from fire; and (3) many currently available flame retardants are toxic or create significant risks of short-term or long-term environmental harm.

Numerous efforts have been made to overcome one or more of these shortcomings. These efforts have resulted in flame retardant products such as Dricon, Non-Com, Holz-Prof, Apyrum, Timonox, Magma Firestop, Firestop, and Firetard 120. Other efforts include the development of a water-based flame retardant for clothing derived from non-toxic ingredients such as clays and chitosan. However, these products are all limited by the types of materials to which they can be applied and/or the conditions under which materials must be treated. Further, all of the foregoing products are flame retardants and are not useful as fire extinguishing agents.

Currently available fire extinguishing agents present several shortcomings: (1) secondary damage caused by use of the fire extinguishing agent; (2) re-ignition risks; (3) short-term or long-term toxicity and environmental damage; and (4) lack of general utility based on limitation to use for specific types of fires.

Water is the most common fire extinguishing agent. It is safe for the environment but does have limitations and shortcomings in its use as a fire extinguishing agent. Water is usually required in large amounts to effectively fight large fires. It rapidly evaporates, and thus only a small portion of the total amount of water sprayed on a fire is utilized to actually extinguish the fire. In addition, when using water to extinguish fire, areas where fire has been extinguished are easily re-ignited. Moreover, the amount of water used to fight a fire often causes secondary water damage, leading to significant restoration costs related to this damage. When fighting fires in enclosed spaces, the risk of vapor explosion due to the presence of high temperature steam is significant. Use of water in firefighting may result in contamination of large amounts of water with pollutants, which will then be spread into the environment. Water also cannot be used to fight fires in many chemical products such as oil, gasoline, ethanol, and many other common flammable chemicals, mixtures, and solutions.

Carbon dioxide is an effective fire extinguishing agent for certain types of fires. It does not leave any residue and is relatively inert. However, toxic concentrations of carbon dioxide are generally required to fight large fires. In addition, carbon dioxide dissipates rapidly and thus it is not an effective agent for smoldering fires or preventing re-ignition. It can also damage certain electronics.

Various foams and powders also are used to fight fires. However, these foams and powders are often toxic, generate toxic byproducts, or are otherwise harmful to the environment. Non-toxic alternatives generally are restricted in their uses, have a limited lifespan, or present other shortcomings. The use of foams and powders often requires expensive clean-up operations after completing the firefighting. The foam or powder often must be applied so as to achieve full coverage of the ignited materials to effectively extinguish the fire. Many foams and powders are limited to use for fighting only specific types of fires. Moreover, because fire extinguishing foams and powders are generally non-adhesive to many materials, the foam or powder may be blown off the previously covered material by wind, leading to re-ignition.

Preventing re-ignition of extinguished surfaces will reduce the response times when a fire occurs, reduce risks to firefighters, increase opportunities to save lives endangered by fire, and increase opportunities to protect property at risk for damage or destruction by fire. Thus there remains a need for flame retarding and fire extinguishing agents that bind to a wide variety of surfaces so that extinguished surfaces cannot re-ignite during firefighting. Moreover, to reduce the environmental impact of firefighting, there also remains a need for environmentally safe, effective flame retarding and fire extinguishing products which can be used to prevent and fight a variety of types of fires in solid materials.

SUMMARY

A novel flame retardant and fire extinguishing product for preventing and fighting fires in solid materials is disclosed herein. The product is thixotropic and non-toxic, and comprises water, one or more flame retardants, one or more stabilizers, and one or more preservatives. In some embodiments, the product further comprises one or more thickeners, one or more binders, one or more fining agents, one or more firming agents, one or more water retention agents, one or more water-soluble fluoropolymers or other water-soluble polymers with similar properties, one or more detergents, and/or one or more surfactants. The product may be used as a flame retardant to prevent fires and may also be used in active firefighting. The product may be biodegradable in a natural environment, may be readily cleaned off equipment and materials to which it has been applied using water, and may also provide other features which render it safe for the environment as compared to other commonly used products in fire prevention and firefighting.

DETAILED DESCRIPTION OF THE PREFERRED EMBODIMENTS

The present disclosure describes a novel thixotropic flame retardant and fire extinguishing product for preventing and fighting fires in solid materials. The product comprises water, one or more flame retardants, one or more stabilizers, and one or more preservatives. In some embodiments, the product further comprises one or more thickeners, one or more binders, one or more fining agents, one or more firming agents, one or more water retention agents, one or more water-soluble fluoropolymers or other water-soluble polymers with similar properties, one or more detergents, and/or one or more surfactants.

Non-toxic as used herein means that the environmental release of known toxic substances from the use of a product is below the safe limits established by the appropriate regulatory agency that are in effect as of the filing date of the present patent application.

In some embodiments, the product may be used as a flame retardant to prevent fires. The product may be applied to a material to render the material fire-resistant. In preferred embodiments, the product may be applied to a material by painting the surface of the material with the product to render the material fire-resistant. In other preferred embodiments, the product may be applied to a material by spraying the surface of the material with the product to render the material fire-resistant. The product may adhere to most solid materials. The solid material may be wood, paper, textile, cellulose board, concrete, plastic, glass, metal, or another material for which fire resistance is desirable. In some embodiments, a material treated with the product may be highly fire resistant, meaning the material will be very difficult ignite when it is exposed to an ignition source. In preferred embodiments, a material treated with the product may be effectively fireproof, meaning the material will not ignite when it is exposed to an ignition source even at the highest temperatures found in most typical fires. In preferred embodiments, the product may be used in indoor and outdoor applications.

In other embodiments, the product may be used in active firefighting. The product may be used to extinguish active fires by applying it to a material affected by fire. The product may be sprayed from a nozzle as an aqueous solution or suspension. When the product is exposed to oxygen, it may form a gel. The rate of gelation will be sufficiently rapid that the product will form a gel upon contacting an ignited material but will not be so rapid that it will inhibit spraying of the product in liquid form. Upon gelling, the product may prevent ignition or re-ignition of the solid material. The product may adhere to most solid materials. The solid material may be wood, paper, textile, cellulose board, concrete, plastic, glass, metal, or another material. The adhered product may form a layer of protection against ignition or re-ignition of the material and thus may be effective in limiting the spread of a fire to adjoining areas.

In some embodiments, the product will be sprayed on an active fire using a nozzle. In preferred embodiments, the distance from the nozzle to the burning material will be greater than the typical distance between a nozzle used to apply foam onto a fire and the burning material. This will allow firefighters to maintain a greater distance from burning material than the distance that would be possible when foam is used to fight a fire. The increased distance will increase safety for the firefighters. It will also allow firefighting to extend further into the affected area.

In some embodiments, the product may penetrate slightly into a material to which it is applied.

In preferred embodiments, the product may be stable under ordinary conditions for long-term storage. In preferred embodiments, the product may be mold and fungus resistant.

In preferred embodiments, the product may provide cooling effects to reduce the temperature of materials affected by fire. In some embodiments, cooling effects may be provided by increased heat absorption capacity of materials treated with the product. In some embodiments, cooling effects may be provided by absorption or trapping of hot flammable gases. In some embodiments, cooling effects may be provided by preventing flammable gases from contacting oxygen. In some embodiments, cooling effects may be provided by rapidly extinguishing an active fire.

In some embodiments, the product may be used to extinguish fires in buildings and other fixed structures, bridges, vehicles, boats, ships, trains, planes, or other solid objects or surfaces. For example, the product may be used to extinguish a gasoline fire where the gasoline spills onto a roadway or other solid surface. In other embodiments, the product may be used to fight forest fires or other wildfires. In some embodiments, the product may be used to create fire breaks when fighting forest fires by utilizing its flame retardant properties such that excavation or tree removal is not required.

In some embodiments, the product may be used in small firefighting equipment such as handheld fire extinguishers and small firefighting equipment for fire trucks. In other embodiments, the product may be used in light and heavy ground-based firefighting equipment and in aerial firefighting equipment such as equipment used by firefighting helicopters and aircraft.

In preferred embodiments, the product may be biodegradable in a natural environment. The product may be an aqueous solution or suspension and may comprise water, inorganic phosphates, sulfates, and ammonium chloride. In preferred embodiments, the product may be free of sources of brominated heavy metals and other heavy metals. In preferred embodiments, the product may also be free of alkyd phosphates and bromides. In preferred embodiments, the product may provide excellent fire prevention or firefighting properties when distributed as a mist to minimize the amount of product used. A reduced amount of product needed for firefighting may reduce storage and transportation needs for a firefighting operation. In preferred embodiments, the product may be readily cleaned off equipment, tools, and materials to which it has been applied using water. These features may render the product safe for the environment as compared to other commonly used fire prevention and firefighting products.

Use of the product may reduce the costs of extinguishing fires and post-fire remediation and restoration. Use of the product may result in less property damage than if water is used to extinguish fires, such as when water is used to extinguish fires in buildings or other structures, and may result in reduced cleanup efforts required than if fire extinguishing powders and foams are used. Moreover, by significantly reducing the risk of re-ignition, use of the product may reduce the number of personnel and amount of firefighting materials and supplies required to ensure an extinguished fire remains extinguished.

For example, when a forest fire has been extinguished with water, the fire will often flare up again as soon as the ground is dry. To prevent such flare ups, the extinguishing work after a major forest fire that has been extinguished with water is both costly and time consuming, as it requires access to personnel and firefighting materials and supplies for a long period of time. By dramatically reducing the risk of re-ignition, use of the product to extinguish a forest fire significantly reduces the number of personnel and amount of firefighting materials and supplies required to ensure the extinguished fire remains extinguished.

Moreover, preventing re-ignition of an extinguished fire will allow rescue personnel to enter an area affected by fire more quickly, as danger to the rescue personnel will be greatly reduced. This increases the opportunities to save the lives of individuals who may have otherwise perished in the fire.

Product Description

The product comprises water, one or more flame retardants, one or more stabilizers, and one or more preservatives. In some embodiments, the product further comprises one or more thickeners, one or more binders, one or more fining agents, one or more firming agents, one or more water retention agents, one or more water-soluble fluoropolymers or other water-soluble polymers with similar properties, one or more detergents, and/or one or more surfactants.

In preferred embodiments, the stabilizer prevents the product from gelling or decomposing when stored in a sealed container and facilitates conversion of the product from a fluid into a gel upon exposure to atmospheric oxygen. In preferred embodiments, the binder prevents the product from separating into its various components. In preferred embodiments, the fining agent stabilizes the product and facilitates creation of an emulsion. In preferred embodiments, the preservative retards decomposition of the product. In preferred embodiments, the thickener increases the viscosity of the product.

In preferred embodiments, the firming and/or water retention agents promote sustained adhesion of the product to the surface of the solid material to which it is applied. In preferred embodiments, the water-soluble fluoropolymers or other water-soluble polymers with similar properties reduce friction, enhance penetration of the product into the solid material to which it is applied, improve the weather-resistance of the product such that it is not readily washed away by rain or other weather events, and enhance the stability of the product. In highly preferred embodiments, the water-soluble fluoropolymers or other water-soluble polymers with similar properties enhance the stability of the product by retarding the decomposition of the flame retardant.

In some embodiments, the flame retardant comprises one or more ammonium salts, one or more nitrogen-containing compounds such as fertilizers, one or more phosphates, and one or more sulfates. In preferred embodiments, the ammonium salt comprises ammonium chloride. In some preferred embodiments, the phosphates comprise one or more organic ammonium phosphates. In other preferred embodiments, the phosphates comprise aluminum phosphate. In highly preferred embodiments, the phosphates comprise one or more organic ammonium phosphates and aluminum phosphate. In preferred embodiments, the sulfates comprise inorganic sulfates.

In preferred embodiments, the ammonium chloride comprises between about 10-15% of the flame retardant powder. In preferred embodiments, the one or more organic ammonium phosphates comprise between about 10-15% of the flame retardant powder. In preferred embodiments, the nitrogen-containing compounds comprise between about 25-55% of the flame retardant powder. In preferred embodiments, the aluminum phosphate comprises between about 10-15% of the flame retardant powder. In preferred embodiments, the sulfates comprise between about 10-15% of the flame retardant powder.

In preferred embodiments, the flame retardant powder comprises between 12-20% of the product. In highly preferred embodiments, the flame retardant powder comprises between 12-15% of the product.

In some embodiments, the stabilizer comprises one or more ingredients selected from the group consisting of alginates, guar gum, potassium phosphates, natural rubber, locust bean gum, guar gum, tragacanth, xanthan gum, karaya gum, tara gum, gellan gum, soybean hemicellulose, pectin, polyethylene glycol, polyoxyethylene (40) stearate, polyoxyethylene-20-sorbitan monolaurate, polyoxyethylene-20-sorbitan monooleate, polyoxyethylene-20-sorbitan monopalmitate, polyoxyethylene-20-sorbitan monostearate, polyoxyethylene-20-sorbitan tristearate, gelatin, ammonium phosphatides, phosphates, diphosphates, polyphosphates, beta-cyclodextrin, cellulose and cellulose derivatives, methyl cellulose, ethyl cellulose, hydroxypropyl cellulose, methylethyl cellulose, fatty acids, salts of fatty acids, monoglycerides, diglycerides, polyglycerol esters of fatty acids, sugar esters of fatty acids, polyglycerol polyricinoleate, and stearyl tartrate. In preferred embodiments, the stabilizer comprises one or more ingredients selected from the group consisting of alginates, guar gum, xanthan gum, and potassium phosphates. In preferred embodiments the stabilizer comprises between 0.05% and 1.0% of the product.

In some embodiments, the preservative comprises one or more ingredients selected from the group consisting of benzalkonium chloride, sorbic acid, sorbate salts, benzoic acid, benzoic acid esters, benzoate salts, 2-hydroxybiphenyl, sodium biphenyl-2-yl oxide, nisin, pimaracin, hexamine, dimethylcarbonate, acetic acid, acetic acid esters, acetate salts, tetraalkyl ammonium chlorides, alkyl benzyl dimethyl ammonium chloride, and isothiazolinones. In some embodiments, the tetraalkyl ammonium chloride may comprise one or more compounds selected from the group consisting of dioctyl dimethyl ammonium chloride, didecyl dimethyl ammonium chloride, and octyl decyl dimethyl ammonium chloride. In some embodiments, the isothiazolinone may comprise one or more compounds selected from the group consisting of methylisothiazolinone and chloromethylisothiazolinone. In preferred embodiments, the preservative comprises one or more ingredients selected from the group consisting of benzoic acid, benzoic acid esters, benzoate salts, acetic acid, acetic acid esters, and acetate salts. In preferred embodiments, the preservative comprises between 0.04% and 1.20% of the product.

In some embodiments, the product further comprises one or more thickeners. In some embodiments, the thickener comprises one or more ingredients selected from the group consisting of xanthan gum and pectin. In preferred embodiments, the thickener comprises xanthan gum. In highly preferred embodiments, the xanthan gum comprises between 0.1% and 1.0% of the product.

In some embodiments, the product further comprises one or more firming and/or water retention agents. In some embodiments, the firming agent comprises calcium propionate. In some embodiments, the water retention agent comprises one or more ingredients selected from the group consisting of glycerol, massage oil, and a low viscosity oil. In preferred embodiments, the firming and/or water retention agent comprises between 0.4% and 0.9% of the product.

In some embodiments, the product further comprises one or more water-soluble fluoropolymers or other water-soluble polymers with similar properties. In preferred embodiments, the water-soluble fluoropolymers or other water-soluble polymers with similar properties comprise between 1.45% and 1.60% of the product.

In some embodiments, the product further comprises one or more binders. In preferred embodiments, the binder comprises one or more ingredients selected from the group consisting of polyesteral, melamine, polyurethane, processed eucheuma seaweed, gum arabic, and cassia gum. In more preferred embodiments the binder comprises between 0.2% and 1.2% of the product.

In some embodiments, the product further comprises one or more fining agents. In preferred embodiments, the fining agent comprises one or more ingredients selected from the group consisting of bentonite, tensides, kaolin, and silica sol. In more preferred embodiments, the fining agent comprises bentonite. In highly preferred embodiments, the bentonite comprises between 0.25% and 1.0% of the product.

In preferred embodiments, the product is a transparent liquid. In some embodiments, the product has a slight ammonia odor in liquid form and is substantially odorless after gellation or after the liquid components evaporate to yield a solid residue. In preferred embodiments, the product has a boiling point between 95° C. and 105° C. at atmospheric pressure. In highly preferred embodiments, the product has a boiling point between 99° C. and 101° C. at atmospheric pressure. In preferred embodiments, the product has a freezing point between −6° C. and 4° C. at atmospheric pressure. In highly preferred embodiments, the product has a freezing point between −2° C. and 0° C. at atmospheric pressure. In preferred embodiments, the product has a pH between 6.0 and 6.8. In preferred embodiments, the product has a viscosity between 3 mPa·s and 80 mPa·s depending on its concentration.

In preferred embodiments, the product may be stable for long-term storage when stored in a sealed container at temperatures between its freezing point and 35° C.

EXAMPLES

The product may be prepared as a ready-to-use solution. In preferred embodiments, the ready-to-use solution comprises the following ingredients: water, a flame retardant, xanthan gum, a dishwashing detergent, vinegar, a sanitizer, and a polymer.

In some embodiments, the ready-to-use solution may preferably comprise ingredients in approximately the following ratios:
(1) 2000 g fire retardant
(2) 16 g xanthan gum
(3) 5 g dishwashing detergent
(4) 7 g 12% aqueous distilled vinegar
(5) 10 g sanitizer
(6) 20 g polymer
(7) 7942 g water The ready-to-use solution may preferably comprise approximately 20% of the active mixture in water.

In some preferred embodiments, the flame retardant may comprise ammonium chloride, one or more nitrogen-containing compounds, one or more organic ammonium phosphates, aluminum phosphate, and sulfates.

Any ordinary dishwashing detergent may be used. For the preparations described below, the dishwashing detergent used was Grumme Diskmedel by Grumme, which comprises: water, sodium laureth sulfate, trideceth-8, cocamidopropyl betaine, sodium chloride, denatured alcohol, lauramine oxide, propylene glycol, perfume, benzisothiazolinone, potassium hydroxide, CL 19140, and CL 42090.

Any ordinary vinegar may be used. For the preparations described below, Absolut Ren Ättika 12% distilled vinegar aqueous solution by Perstorp Ättika was used.

Any ordinary sanitizer may be used. For the preparations below, the sanitizer used was a preservative, disinfectant sanitizer by Biosphere Innovation which comprises: water, dimethyl ammonium chloride (1-3%), didecyldimethyl ammonium chloride (1-3%), decyldimethyloctyl ammonium chloride (1-3%), and $C_8$-$C_{18}$-alkylbenzyldimethyl ammonium chloride (1-5%).

Any ordinary water-soluble fluoropolymer or other water-soluble polymer with similar properties may be used. For the preparations below, a fluoropolymer product by Fiber Pro-Tector Norge AS comprising 1-5% perfluoroalkyl copolymer, 5-10% acetic acid, and water was used.

Preparation of Ready-to-Use Solution:

The ready-to-use solution may be prepared as described below. 3000 g of water is heated to approximately 60° C. in a suitable container. The water temperature should not be less than 53° C. or greater than 65° C. 2000 g of the flame retardant is added to the water while stirring with an electronic stirrer and is stirred until the flame retardant dissolves completely. The flame retardant used should preferably be dry and should preferably have previously been stored at ambient temperature. 10 g of the polymer is added, then 8 g of the xanthan gum is added, and the resulting mixture is stirred vigorously until the components dissolve completely. 5 g of the dishwashing detergent is then added to the solution while stirring and the mixture is stirred until the detergent dissolves completely. 10 g of the polymer is then added to the solution while stirring and the mixture is stirred until the polymer dissolves completely. 8 g of xanthan gum is then added to the solution while stirring and the mixture is stirred vigorously until the xanthan gum dissolves completely. The solution is then cooled 40-45° C. without an external cooling source. In a separate container, 4942 g of water is heated to approximately 40-43° C. The water temperature should not be less than 35° C. or greater than 45° C. 7 g of distilled 12% aqueous vinegar is then added to the solution with electronic stirring and then the mixture is stirred until the vinegar dissolves completely. The solution is then cooled to below 40° C. without an external cooling source. The temperature should not drop below 35° C. during this cooling step. 10 g of sanitizer concentrate is then added to the solution with electronic stirring and then the mixture is stirred until the sanitizer dissolves completely. The solution comprising flame retardant, polymer, detergent, and xanthan gum is slowly added to the solution comprising vinegar and sanitizer with stirring with the electronic stirrer until the solutions are uniformly mixed.

The solution is then preferably allowed to cool to approximately 15-20° C. without an external cooling source, filtered, and then poured into plastic containers of suitable size and each container is sealed with an airtight cap.

Excess stirring after components are dissolved may cause undesirable excessive drop in temperature of the solution. The sequence of addition of components minimizes undesired side reactions and promotes long-term stability of the product. The solutions must be prepared approximately simultaneously due to the thickening effects caused by xanthan gum upon allowing the solution comprising xanthan gum to stand.

Laboratory Testing:

The desired properties of an effective flame retardant sought in laboratory testing of flame retardant products include: (1) high stability during use, which would not lead to a high degree of separation of the liquid; (2) no uneven thickening, with different grades of thickening within the product upon contact with the enflamed materials; (3) no harmful chemical reactions between components that would degrade the product during storage or use; (4) stability for long-term storage; and (5) suitability for use on peripheral equipment.

All laboratory tests were conducted at about 20° C. and approximately 40-60% humidity with some additional variance for tests conducted during winter months. All test products were prepared, manufactured, and stored in a laboratory, and were stored and transported in non-transparent plastic containers.

General conclusions from laboratory testing include: (1) temperature and humidity has a significant impact on the effectiveness of the product when used outdoors and (2) small fires are extinguished more easily during winter months or low temperatures. However, small fires are still effectively extinguished in all cases using the proper products.

Large Scale Testing:

Large scale testing was conducted in conjunction with state- or nation-level authorities and institutions. The product was provided to the testing authority, the tests were conducted by the authority, and the results were obtained and controlled by said authority. Test results were often confirmed using thermal cameras and/or timing devices. General conclusions from large scale testing include: (1) temperature and humidity has a significant impact on the effectiveness of the product and (2) small and medium-sized fires are more easily extinguished than large fires.

One example of a large scale test is described below. Bales containing densely packed crushed industrial waste were tested in Bollnäs, Sweden on Apr. 16, 2013. Four bales were protected with flame retardant before being placed in the test area. Two bales were untreated. The bales were covered by a thin plastic which would melt from exposure to high heat, and thus the crushed industrial waste was directly exposed to radiant heat during the experiment. The six bales were placed around an oblong pile of scrap wood with three bales on either side. Two bales on each side of the wood pile were treated and one was untreated. A treated wood façade was placed on one end and an untreated wood façade was placed on the other end. A nearby wall was also treated with the flame retardant product.

Fire extinguishers containing the flame retardant product and fire extinguishers containing water only were both used to demonstrate the effectiveness of the flame retardant product in extinguishing fires. The wood pile was soaked with a combustible fluid to ensure that the fire spreads across the entire surface of the wood pile simultaneously. The wood pile was then ignited, generating a fire.

Treatment of the plastic with the flame retardant product did not appear to inhibit the spread of fire to the underlying bales. Fires that were extinguished with the flame retardant product remained extinguished and did not reignite. Fires that were extinguished with water reignited upon evaporation of the water. Fires were more quickly extinguished with the flame retardant product than with water. The wall treated with flame retardant product did not ignite, despite exposure to 220° C. radiant heat and direct exposure to flames from the fire.

This test demonstrates that the flame retardant product would likely be an effective fire extinguishing agent for a fast surface fire within a confined area.

Toxicity Studies:

One example of a toxicity study is provided below. A comparison study was performed between untreated plywood and plywood impregnated with the product. Toxicity measurements indicated that treating plywood with the product resulted in decreased atmospheric release of hydrochloric acid (HCl) and increased atmospheric release of carbon monoxide (CO), hydrogen cyanide (HCN), and nitrous oxide (NO) following exposure of the treated plywood to fire as compared to untreated plywood. The amount of carbon monoxide, hydrogen cyanide, and nitrous oxide release was within the limits established by the U.S. Environmental Protection Agency for a fire retardant to be considered non-toxic.

In one series of toxicity tests, three samples of Moelven Vänerply P30, a softwood plywood comprising spruce, were impregnated with the product by treating the plywood with the product for 72 hours, resulting in a concentration of the product impregnated into the plywood after treatment of 0.68 L/m$^2$, and subsequently dried. Three additional samples of Moelven Vänerply P30 were left untreated and were also subsequently dried. The tests were performed under conditions of IMO 2010 FTP Code Part 2. The amounts of various toxic gaseous byproducts released during testing were measured by Fourier transform infrared spectroscopy (FTIR). The average atmospheric releases of various toxic gaseous byproducts across three tests each for plywood impregnated with the product and untreated plywood are shown in Table 1 below:

TABLE 1

Release of Toxic Gaseous Byproducts

| Hazardous Gaseous Byproduct | Release from Untreated Plywood (ppm) | Release from Product-Impregnated Plywood (ppm) |
|---|---|---|
| CO | 650 | 1311 |
| $SO_2$ | 0 | 0 |
| NO | 0 | 36 |
| $NO_2$ | 0 | 0 |
| HCl | 182 | 0 |

TABLE 1-continued

Release of Toxic Gaseous Byproducts

| Hazardous Gaseous Byproduct | Release from Untreated Plywood (ppm) | Release from Product-Impregnated Plywood (ppm) |
|---|---|---|
| HCN | 0 | 44 |
| HBr | 0 | 0 |
| HF | 2 | 1 |

Under the conditions of the test, all hazardous gaseous byproduct emissions from plywood impregnated with the product were below levels deemed toxic.

The disclosure and examples above are intended as illustrative and are not intended to limit or otherwise restrict the invention. Numerous variations and modifications will become apparent to those skilled in the art upon full appreciation of the above disclosure. For example, one skilled in the art will understand that a variety of different formulations that rely on the same underlying principles used to generate the formulations disclosed above may effect the same results as the disclosed formulations. It is intended that the following claims be interpreted to embrace all such variations and modifications.

All references cited herein are expressly incorporated by reference.

What is claimed is:

1. A method of fighting or preventing a fire in a solid material comprising applying a product to a solid material, wherein the product comprises a flame retardant comprising ammonium chloride, an organic ammonium phosphate, aluminum phosphate, and an inorganic sulfate.

2. The method of claim 1, wherein the flame retardant comprises between about 10% by weight and about 30% by weight of the ammonium chloride.

3. The method of claim 1, wherein the flame retardant comprises between about 10% by weight and about 15% by weight of the aluminum phosphate.

4. The method of claim 1, wherein the flame retardant comprises between about 10% by weight and about 30% by weight of the inorganic sulfate.

5. The method of claim 1, wherein the flame retardant comprises:
    between about 10% by weight and about 30% by weight of ammonium chloride;
    between about 10% by weight and about 20% by weight of one or more organic ammonium phosphates;
    between about 10% by weight and about 15% by weight of aluminum phosphate; and
    between about 10% by weight and about 15% by weight of one or more inorganic sulfates.

6. The method of claim 1, wherein the flame retardant further comprises nitrogen-containing fertilizer.

7. The flame retardant of claim 6, wherein the flame retardant comprises between about 25% by weight and about 55% by weight of the nitrogen-containing fertilizer.

8. The method of claim 1, wherein the product further comprises water, a stabilizer, and a preservative.

9. The method of claim 8, wherein the stabilizer is selected from the group consisting of alginates, guar gum, potassium phosphates, natural rubber, locust bean gum, guar gum, tragacanth, xanthan gum, karaya gum, tara gum, gellan gum, soybean hemicellulose, pectin, polyethylene glycol, polyoxyethylene (40) stearate, polyoxyethylene-20-sorbitan monolaurate, polyoxyethylene-20-sorbitan monooleate, polyoxyethylene-20-sorbitan monopalmitate, polyoxyethylene-20-sorbitan monostearate, polyoxyethylene-20-sorbitan tristearate, gelatin, ammonium phosphatides, phosphates, diphosphates, polyphosphates, beta-cyclodextrin, cellulose and cellulose derivatives, methyl cellulose, ethyl cellulose, hydroxypropyl cellulose, methylethyl cellulose, fatty acids, salts of fatty acids, monoglycerides, diglycerides, polyglycerol esters of fatty acids, sugar esters of fatty acids, polyglycerol polyricinoleate, and stearyl tartrate.

10. The method of claim 9, wherein the stabilizer is selected from the group consisting of alginates, guar gum, xanthan gum, and potassium phosphates.

11. The method of claim 9, wherein the product comprises between 0.05% and 1.0% of the stabilizer.

12. The method of claim 8, wherein the preservative is selected from the group consisting of benzalkonium chloride, sorbic acid, sorbate salts, benzoic acid, benzoic acid esters, benzoate salts, 2-hydroxybiphenyl, sodium biphenyl-2-yl oxide, nisin, pimaracin, hexamine, dimethylcarbonate, acetic acid, acetic acid esters, acetate salts, tetraalkyl ammonium chlorides, alkyl benzyl dimethyl ammonium chloride, and isothiazolinones.

13. The method of claim 12, wherein the preservative is selected from the group consisting of benzoic acid, benzoic acid esters, benzoate salts, acetic acid, acetic acid esters, and acetate salts.

14. The method of claim 12, wherein the preservative comprises between 0.04% and 1.20% of the product.

15. The method of claim 8, wherein the stabilizer is xanthan gum and the preservative is acetic acid.

16. The method of claim 1, wherein applying the product to the solid material causes the product to adhere to the solid material.

17. The method of claim 1, wherein applying the product to the solid material prevents ignition or reignition of the solid material.

* * * * *